United States Patent
Saalfeld et al.

(10) Patent No.: US 10,778,585 B1
(45) Date of Patent: Sep. 15, 2020

(54) CONNECTION AND APPLICATION STATE MIGRATION FOR UNINTERRUPTED SERVICE AVAILABILITY

(71) Applicant: Amazon Technologies, Inc., Seattle, WA (US)

(72) Inventors: Christoph Saalfeld, Seattle, WA (US); Calvin Yue-Ren Kuo, Mercer Island, WA (US); James Christopher Sorenson, III, Seattle, WA (US); Alexandra Elizabeth Baoboe Lee, Seattle, WA (US); Bryant Cutler, Maple Valley, WA (US); Aditya Bhalla, Shoreline, WA (US); Shyam Krishnamoorthy, Redmond, WA (US); Tristam Kyle MacDonald, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 15/365,859

(22) Filed: Nov. 30, 2016

(51) Int. Cl.
*H04L 12/803* (2013.01)
*H04L 29/08* (2006.01)
(Continued)

(52) U.S. Cl.
CPC ........ *H04L 47/125* (2013.01); *H04L 43/0805* (2013.01); *H04L 43/0876* (2013.01);
(Continued)

(58) Field of Classification Search
CPC ............... H04L 47/125; H04L 43/0805; H04L 43/0876; H04L 67/1002; H04L 12/6418;
(Continued)

(56) References Cited

U.S. PATENT DOCUMENTS

| 8,972,548 B2 | 3/2015 | Jacob et al. |
| 9,292,367 B2 | 3/2016 | Mickens |

(Continued)

FOREIGN PATENT DOCUMENTS

EP    1494421 A1 * 1/2005    ............. H04L 29/06

*Primary Examiner* — Chris Parry
*Assistant Examiner* — Abderrahmen Chouat
(74) *Attorney, Agent, or Firm* — Robert C. Kowert; Kowert, Hood, Munyon, Rankin & Goetzel, P.C.

(57) ABSTRACT

Compute hosts and a routing system may be used for connection and application state migration for uninterrupted service availability. In response to an indication to transfer a connection from a particular compute host to another compute host, the particular compute host obtains a connection state and an application state for the connection and sends the connection state and the application state to the other compute host. The connection state includes information for a connection-oriented protocol and the application state includes information for an application-layer protocol. The other compute host receives and applies the connection state and the application state in order to establish a termination point to terminate the connection at the other compute host instead of at the particular compute host. The data for the connection is routed to the other compute host, wherein the client is unaware of transfer of the connection to the other compute host.

20 Claims, 11 Drawing Sheets

(51) Int. Cl.
*H04L 12/26* (2006.01)
*H04L 12/64* (2006.01)

(52) U.S. Cl.
CPC ...... *H04L 67/1002* (2013.01); *H04L 12/6418* (2013.01); *H04L 67/02* (2013.01)

(58) Field of Classification Search
CPC ..... H04L 67/02; H04L 67/1029; H04L 29/06; H04L 67/1008; H04L 67/327; H04L 67/1023; H04L 67/14; H04L 69/329; H04L 69/40; H04L 67/1017; H04L 67/1034; H04L 67/2842; H04N 21/2181; H04N 21/6405; H04N 21/64322; H04N 21/6473; H04N 7/08; G06F 11/2023; G06F 11/2038; G06F 16/25; G06F 2009/4557; G06F 8/656; G06F 9/45533; G06F 9/45558; G06F 9/4862; G06F 9/5077; G06F 9/5083; G06F 9/5088
See application file for complete search history.

(56) References Cited

U.S. PATENT DOCUMENTS

| | | | | |
|---|---|---|---|---|
| 2010/0077035 | A1* | 3/2010 | Li | H04L 67/02 709/206 |
| 2014/0108516 | A1* | 4/2014 | Ekeroth | G06F 11/1658 709/203 |
| 2015/0370596 | A1* | 12/2015 | Fahs | G06F 9/46 718/1 |
| 2018/0139101 | A1* | 5/2018 | Puri | G06F 9/4856 |

\* cited by examiner

CONNECTION AND APPLICATION STATE MIGRATION FOR UNINTERRUPTED SERVICE AVAILABILITY

BACKGROUND

With the increased availability of different smart devices that access the internet, many new applications have been developed that leverage internet connectivity. The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, etc. Many client devices make use of a long-lived connection with a server in order to stream data from the client device to the server and from the server to the client device whenever data needs to be transmitted (e.g., publish-subscribe communication). The continuously open connection allows a server to consistently send data to a connected client without the client continuously polling for new data from the server.

When a server needs to be rebooted, a client device with a long-lived connection to the server loses the connection. Therefore, the client device will not send or receive data until a new connection is established. In many cases, a single server may maintain a large number of long-lived connections with many different client devices. Thus, a significant workload may be placed on a particular server due to many client devices transmitting a large volume of data within a short period of time.

Figure 1:
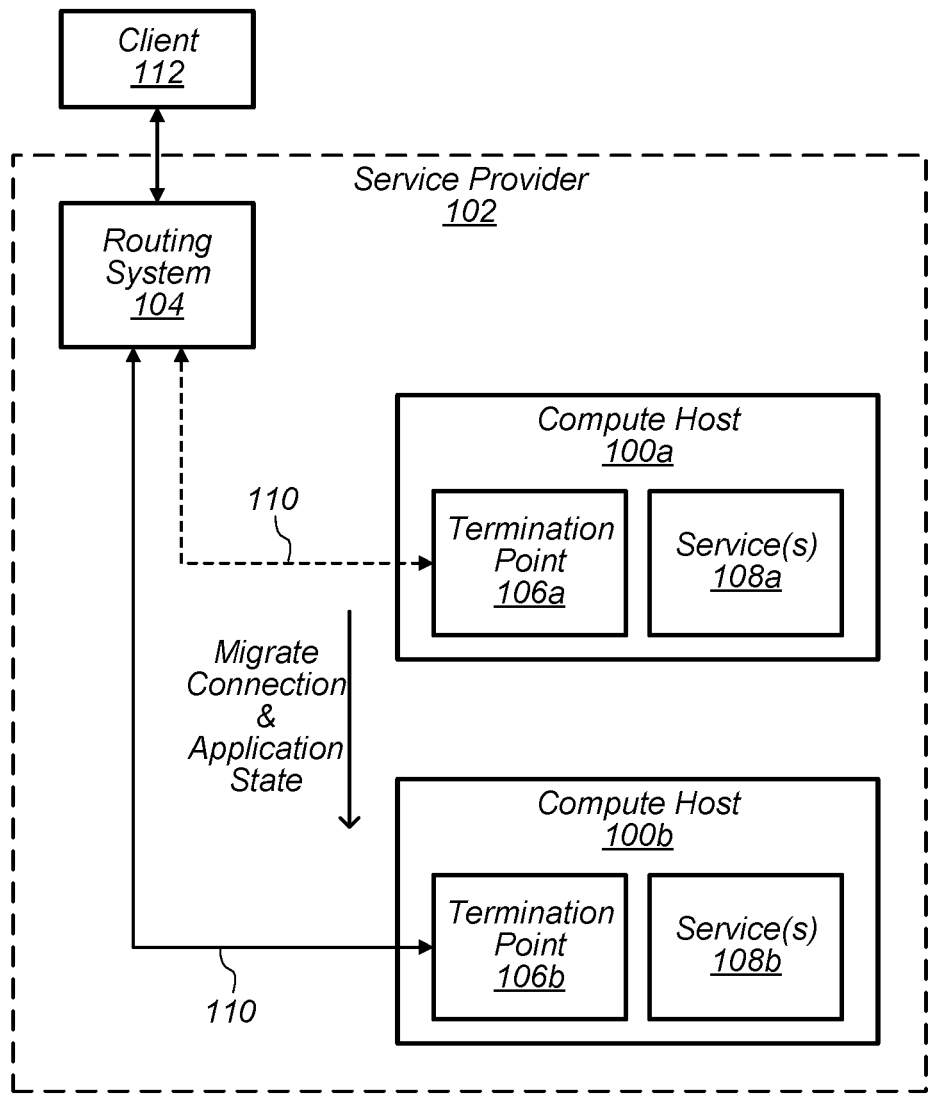
FIG. 1 illustrates a system for connection and application state migration for uninterrupted service availability, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement connection and application state migration for uninterrupted service availability. In response to an indication to transfer a connection (e.g. a connection to a client device) from a particular compute host to another compute host, the particular compute host may obtain a connection state and an application state for the connection and may transmit the connection state and the application state to the other compute host. The connection state may include information for a connection-oriented protocol (e.g., transmission control protocol (TCP)) and the application state may include information for an application-layer protocol (e.g., transport layer security (TLS), message queuing telemetry transport protocol (MQTT), and hypertext transfer protocol (HTTP)).

The other compute host may receive the connection state and the application state and may apply the connection state and the application state to the other compute host in order to establish a termination point to terminate the connection (e.g., establish an endpoint for the connection) at the other compute host instead of at the particular compute host. The data for the connection may then be routed (e.g., by a routing system) to the other compute host instead of to the particular compute host, wherein the client is unaware of transfer of the connection from the particular compute host to the other compute host.

Most internet traffic uses transaction-based communication (e.g., HTTP request-response communication) for interactions between clients and servers. While those transactions run over a TCP connection and TLS session on top of the TCP connection to secure communication, each HTTP request and its response represent an individual transaction. Each transaction can occur between a client and a different server for each request. This concept is often used to load-balance traffic of such transactions to multiple hosts of a horizontally scalable web service, depending on the load of the back-end servers.

With the rise of IoT, alternative protocols are evolving and are being implemented in smart devices that make use of long-lived TCP/TLS connections to stream event-driven data from the client to the server and from the server to the client whenever data needs to be transmitted (e.g., publication-subscribe (pub/sub) communication). The continuously open connection, which may be initiated from the client once after reboot or power-up, allows a server to constantly be able to send data to a connected client (regardless of any network address translation (NAT) infrastructure in-between).

In various embodiments, pub/sub communication decouples a publisher, who may send a particular message, from one or more subscribers, who receive the message. A broker, which may be known by both the publisher and subscriber, may filter incoming messages and distribute them. In some embodiments, the publisher and the subscriber do not need to know each other (e.g., by IP address and/or port). In various embodiments, the publisher and the subscriber do not need to run at the same time. In embodiments, operations on the publisher and the subscriber are not halted during publishing or receiving of messages. Through filtering of messages, certain messages may be delivered to only a particular group of clients.

A temperature sensor is an example of an IoT device that may use a pub/sub protocol. The temperature sensor may publish a current temperature value (e.g., "60 degrees") to a "temperature" topic, which may send a message to a broker that includes the current temperature value ("60 degrees") of the temperature sensor. If a device (e.g., smartphone, laptop, server, or other computing device) is subscribed to the "temperature" topic, then the broker may send the current temperature value ("60 degrees") to the device. Further, any number of other devices that are subscribed to the same "temperature" topic may also receive the current temperature.

MQTT is an example of a pub/sub-based messaging protocol that may be used on top of the TCP/IP protocol and allows for bi-directional communication between an IoT device (e.g., temperature sensor, sprinkler controller, doorbell video camera, connected security system, car devices, electronic appliances, lights, alarm clocks, vending machines, etc.) and an MQTT broker. When a message is published on an MQTT topic, the message is sent to the MQTT message broker, which is responsible for sending messages published on a particular MQTT topic to clients that are subscribed to the particular MQTT topic.

In embodiments, when an event occurs that requires the client to be triggered, a message may be sent from the server to the client without the client continuously polling for new data from the server (e.g., via repeated HTTP requests). This allows clients to reduce the amount of data to be sent, reduces latency for event-driven data to be delivered, and thus can reduce energy consumption for wireless battery-powered devices, since the radio doesn't need to transmit data continuously. For example, a smart sprinkler that is connected to a local wireless device (e.g., via WiFi) may receive a command from a mobile app (e.g., via a smartphone) that transmits the command to a server. The server may then route the message to the smart sprinkler, since the sprinkler previously opened a connection to the server and the connection has remained open.

Whenever the server needs to be rebooted (e.g. to perform a software upgrade) it may close all connections, so clients may have to reconnect. If a client has not received the connection closure command, it take a relatively long time to detect that the previously existing connection is terminated. During the time when client devices are disconnected, they may miss message data from the server and may therefore be unable to react to one or more messages. Furthermore, re-connecting may require clients to re-negotiate a connection (e.g., a TLS connection), which may require more bandwidth and energy. Thus, re-connecting and re-negotiating may be challenging for battery-operated cellular devices that may have a limited data contract.

Similarly, when a server is overloaded due to too much traffic coming in through several connections that were previously idle, the server may have to shed the load and disconnect these clients (even though the clients have data to transfer), so that the clients can reconnect to another less loaded server. A server may become overloaded because long-lived connections, which may stay at a particular server once they are established, may be idle most of the time and send bursts of data once in a while (e.g. a connected doorbell device that only transfers video when it detects motion or is used as a remote camera by the user). In order for the back-end to be cost efficient (low-cost connectivity is desirable for many IoT devices), a single server may be connected to several hundreds of thousands of idle connections, while it may only be capable of serving a few thousand active connections.

Thus, various embodiments may provide the ability to move long-lived connections (e.g. (TCP) and (TLS)) between back-end compute hosts (e.g., server) without the client noticing the move of the communication stack in the back-end. In embodiments, the client may continue to send data to (or connect to) the same target internet protocol (IP) address and the same target port as before migrating the connection, and to continue to be reachable from a server. Thus, even though the endpoint for a connection may move from one compute host to another compute host, the same target IP address and/or target port may be used by the client. In an embodiment, long-lived connections (e.g., TCP and TLS) between hosts of a horizontally scalable web service fleet may be moved without disconnecting currently connected clients that are using the long-lived connections, and the move of the connection and associated application state on the back-end is transparent to the connected clients.

In embodiments, a routing component that can route packet-based internet protocol (IP) traffic between a client and a server allows the routing relationship to be changed on the fly (e.g., via access to an application programming interface (API)), so that a managing component can instruct the routing component and/or load-balancing equipment to change the target server to and from which traffic is routed from and to a client. The routing component may perform packet routing and may modify source IP, target IP, source port, target port, and network protocol while routing packets (a network address translation (NAT) implementation). This routing component may be comparatively simple from a software complexity perspective and may rarely need to be updated, compared to more complex back-end servers. In embodiments, the routing component may also perform load-balancing.

In various embodiments, a TCP socket may "freeze" its current state on Host 1 and transfer the frozen TCP state to Host 2 per instruction from a managing component. Similarly, a TLS implementation may cause a TLS session state to be "frozen" on Host 1 and cause the frozen TLS session state to be transferred to Host 2. Once both the TCP state and the TLS state (and any relevant context information) are transferred to Host 2, the routing component may be instructed by the management component to route any subsequent packets to Host 2 instead of Host 1. The particular implementation of TCP and TLS on Host 2 may "thaw" the previously "frozen" connection state and application state (e.g., TCP state, TLS state, and/or context information) and may resume communication with the client. In embodiments, the routing equipment may abstract the IP address change, according to a NAT implementation. In an embodiment, the management component initiates transfer of connections. The management component may be implemented on one or more dedicated servers or as a decentralized piece of functionality (e.g. a distributed application) that operates via a chatter protocol between compute hosts.

In an embodiment, at least some of the process for freezing, migrating, and restoring the state for the connection-oriented protocol (e.g., TCP) and/or the state for the application-layer protocol (e.g., TLS) may be implemented by an operating system (e.g., linux kernel). For example, linux may freeze and restore the state of a shell and keep all of the connections intact on the same machine. A host may be rebooted and a session may still continue operation. In embodiments, an operating system may be used to freeze and/or migrate the state for the connection-oriented protocol (e.g., TCP) to another host, where the operating of the other host can unfreeze the state. Thus, in embodiments, a connection manager or other operating system and/or application of the compute host may be used to freeze and migrate the state for the application-layer protocol (e.g., TLS) to another host, where it can be unfrozen and restored, in order to complete migration of the connection from one host to another host. Thus, the connection may be migrated to the other host and continue operation, with the client unaware of the transfer of the connection.

In some embodiments, during a deployment of new software to one or more back-end servers, the management component may initiate and coordinate a transfer of up to all of the connections from a back-end compute host that will receive a software update to another compute host. Once the connections are migrated off the compute host, the compute host will receive its software update and can receive connections again. The process may be repeated until all compute hosts have received a software update. Similarly, one compute host may be updated, and then individual connections may be moved to the host to verify whether the new software does not affect the functionality of the one or more services operating on the host (e.g., a one-box deployment). In embodiments, a particular host that servers many idle connection may become overloaded by some "hot" connections. One or more of the hot connections may be moved from the overloaded host to a dedicated host that has enough capacity to serve the traffic on the hot connections.

In embodiments, clients may remain connected (at least from the client's point of view) and do not have to initiate a reconnection, which may save energy, save bandwidth and increase connection reachability/reliability. In some instances, back-end hosts may be "oversubscribed" to serve multiple of idle connections, because individual hot connections may be moved off during an overload situation without affecting the client. This may reduce noisy neighbor problems and reduce operational cost for running a back-end that serves long-lived connections. By avoiding disconnects and reconnects, the traffic that goes over the data center's internet connection may be drastically reduced, since the traffic to move a connection occurs inside the data center. The CPU load on hosts may be reduced, since the CPU-intensive part of a TLS connection is the connection negotiation (e.g., exchange encryption key, verify authenticity of server and client), while a mostly idle connection may not require heavy crypto operations.

In some embodiments, migration of data for a connection and the associated application state is performed by encrypting at least portions of the connection state and the application state that are transferred (and subsequently decrypted at the receiving host). For example, migration of a TLS context or an MQTT session may be performed through encryption, wherein decryption is performed at the server being migrated to.

In embodiments, application data may be spread across multiple packets. Thus, freezing may fragment the application data. For example, a first packet may be sent to a first compute host and a second packet may be sent to a second compute host being migrated to. In some embodiments, the second compute host may receive HTTP state information from the first compute host and reconstitute the first packet and associated data on the second host. Thus, in embodiments, TCP fragments may be reconstituted and combined higher-level application data. In some instances, the second host may verify that all relevant packets have been received by determining whether all packet sequence numbers within a sequence have been received. If any packet sequence numbers are missing, then the second host my request that the client send the packets associated with the missing sequence numbers.

In certain embodiments, after a connection is transferred from a first host to a second host, any non-acknowledged packets that were sent to the first host are dropped, and then are re-sent by the client (e.g., according to a TCP implementation). In other embodiments, the first host may instead forward non-acknowledged packets to the second host (or to an interim station), which can then provide the non-acknowledged packets when applying the connection state and the application state at the second host in order to migrate the connection to the second host.

As the number of long-lived connections increases, the above benefits may increase in importance. Various embodiments provide for a reduced cost of operating a back-end to provide a managed connectivity broker (e.g., a service for IoT client devices), and therefore may allow more competitive pricing for a managed service. Furthermore, embodiments may increase availability of long-lived connections, reduce battery consumption for client devices, and reduce the volume of data to be transferred while maintaining high availability and reachability for client devices.

In embodiments, a client or client IoT device may be any type of internet-capable client device (e.g. any device capable of connecting, via the internet, to a compute host of a remote service provider). In various embodiments, one or more internet-capable devices receive one or more commands (or any other data, requests, etc.) from and/or send data (commands, requests, or any other data) to respective compute hosts over respective connections. For example, 100 IoT devices may each receive commands and/or send data to a particular compute host over 100 respective connections, and 200 other IoT devices may each receive commands from and/or send data to another compute host over 200 respective connections.

In some embodiments, the one or more internet-capable devices may continue to receive one or more commands from and/or continue to send data to other compute hosts over the same respective connections after the connections are transferred from the respective compute hosts to the other compute hosts. For example, after the 100 respective connections at the particular compute host are transferred to a different compute host, the 100 IoT devices may each continue to receive commands and/or send data to the different compute host over the same 100 respective connections, while each of the 100 IoT devices are unaware of the transfer of the respective connection. Thus, the 100 IoT devices may continue to receive one or more commands or send data over the same connection without having to establish a new connection with the different compute host. Further, in various embodiments, only some connections may be transferred, and connections may be transferred to different compute hosts. For example, 100 over the 200 connections may remain at the other compute host, while the remaining 100 connections are transferred to two other compute hosts (e.g., 50 to one and 50 to another).

In some instances, individual compute hosts may implement a service that sends multiple commands to individual internet-capable devices during different time periods without the internet-capable device having to poll the service for a command. This may allow an IoT device to save energy and reduce bandwidth by not having to poll the service. For example, a sprinkler may receive different commands to perform different actions at different periods of time without having to poll the service for any of the received commands.

FIG. 1 illustrates a system for connection and application state migration for uninterrupted service availability, according to some embodiments. The compute hosts 100a and 100b depicted in FIG. 1 may be the same type of compute host, and include some or all of the same components as other compute hosts depicted in FIGS. 1-9, in embodiments.

In the depicted embodiment, a service provider 102 includes the compute hosts 100a and 100b and a routing system 104. The compute host 100a includes a termination point 106a and one or more services 108a. The compute host 100b includes a termination point 108a and one or more services 108a. The termination point 106a terminates a connection 110 between a client 112 and the compute host 100a. In various embodiments, a termination point for a given connection 110 is an endpoint for the given connection between a client 112 and a compute host 100a. In embodiments, the connection 110 is migrated from the compute host 100a to the compute host 100b, such that the termination point 106b terminates the connection 110 instead of the termination point 106a. (e.g., the endpoint for the connection 110 is moved from the compute host 100a to the compute host 100b). A connection state of the connection 110 (e.g., information for a connection-oriented protocol such as TCP) may be transferred from the compute host 100a to the compute host 100b in order to migrate the connection 110.

In some embodiments, an application state for the connection 110 (e.g., information for an application-layer protocol such as TLS, MQTT, or HTTP) may also be transferred from the compute host 100a to the compute host 100b in order to migrate the connection 110 to the compute host 100b. Thus, a service 108a or 108b may be a software application or software service used by the client 112. In embodiments, the connection 110 and/or data transmitted via the connection 110 may be transmitted to and/or from one or more services 108a or 108b. At least some of the data transmitted via the connection 110 may be generated by and/or received by one or more services 108a or 108b. In embodiments, a connection state for the connection 110 at the compute host 100a and an application state for the connection 110 at the compute host 100a is transferred from the compute host 100a to the compute host 100b in order to migrate the connection 110 to the compute host 100b and to continue operation of one or more applications (e.g., one or more services 108b) at the compute host 100b instead of at the compute host 100a.

In embodiments, the routing system 104 routes data from the client 112 to the compute host 100a before migrating the connection state and the application state for the connection 110 to the compute host 100b. After migrating the connection state and the application state for the connection 110 to the compute host 100b and applying the connection state and the application state to the compute host 100b, the routing system 104 routes data from the client 112 to the compute host 100b, which may complete migration of the connection 110 to the compute host 100b.

Figure 2:
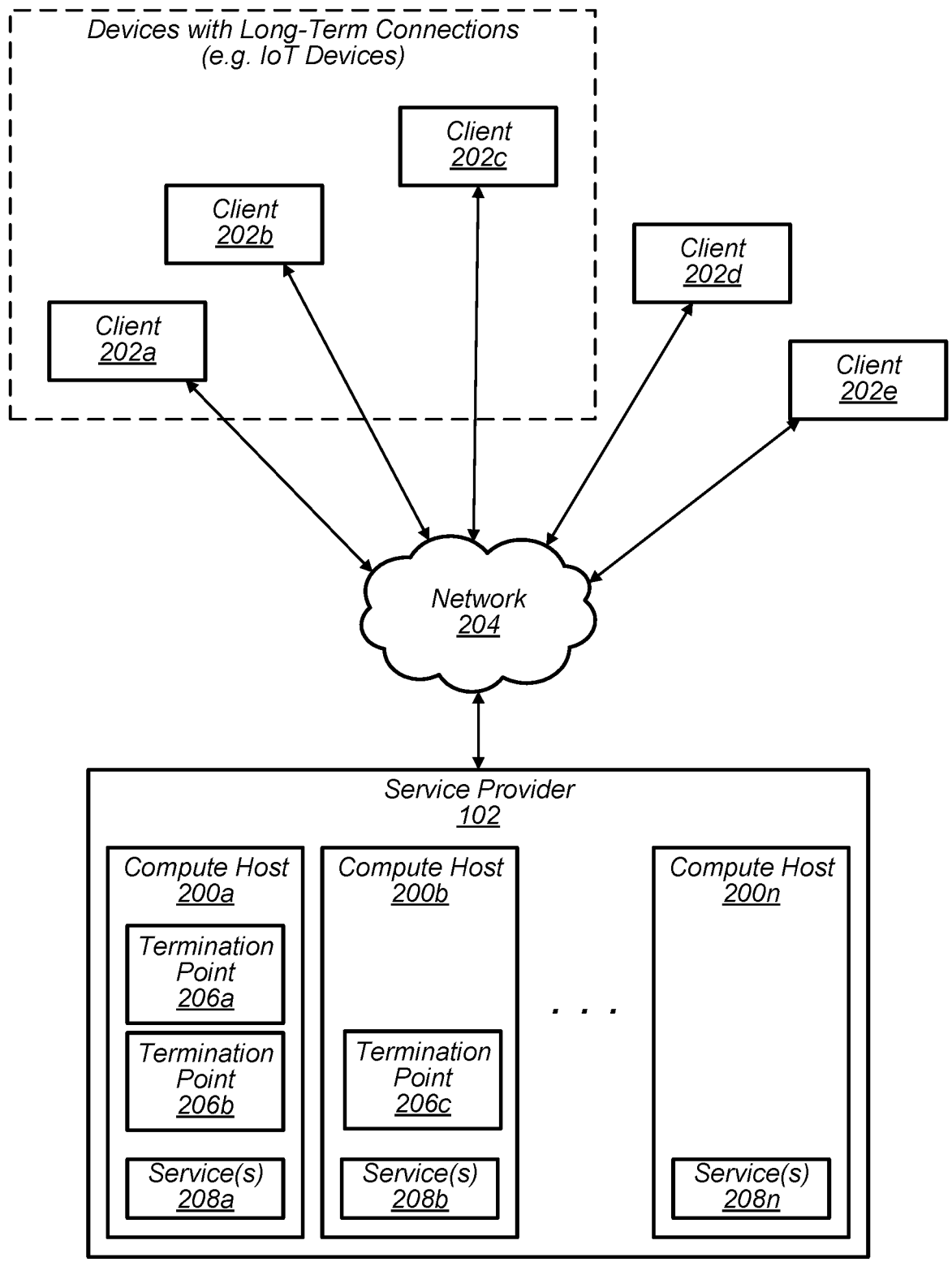
FIG. 2 illustrates a system for connection and application state migration for uninterrupted service availability for multiple clients, according to some embodiments.

FIG. 2 illustrates a system for connection and application state migration for uninterrupted service availability for multiple clients, according to some embodiments. In the depicted embodiment, a service provider 102 includes any number of multiple compute hosts 200, including 200a and 200b-100n. The service provider 102 may also include one or more routing systems 104 (not shown) that route data between each of the clients 202 and a respective compute host 200.

In the example embodiment, client 202a, client 202b, and client 202c are each IoT devices that have a long-term connection with a respective compute host 200, via an intermediate network 204 (e.g., a wide-area network, such as the internet). In the embodiment, the client 202a has a connection that terminates at the termination point 206a of compute host 200a, the client 202b has a connection that terminates at the termination point 206b of compute host 200a, and the client 202c has a connection that terminates at the termination point 206c of compute host 200b. In embodiments, any given compute host 200 may have any number of termination points that terminate any number of corresponding connections to any number of corresponding clients 202. Also depicted are one or more services 208a of compute host 200a, one or more services 208b of compute host 200b, and one or more services 208n of compute host 200n.

In an embodiment, a client 202d and a client 202e each have connections with one or more of the compute hosts 200 via the network 204. For example, the client 202d may have a connection with compute host 200a and the client 202e may have a connection with compute host 200b. However, any other combination of connections and compute hosts 200 are possible, including the same compute host 200 terminating a connection for the client 202d and the client 202e.

In embodiments, the client 202d and/or the client 202e may be a device that receives data from and/or provides data to (e.g., commands) a client with a long-term connection, such as the client 202a, 202b, or 202c. Thus, the connection for the client 202d or 202e may not necessarily be a long-term connection, but may be suitable for obtaining data from another client device or providing one or more commands to another client device. For example, the client 202d may be a smart phone or other device and the client 202a may be a smart sprinkler, where the client 202d sends a command to the client 202a in order to turn on the smart sprinkler to water grass. In embodiments, the command is sent from the client 202d via the network 204 to a compute host 200 and the compute host then sends the command to the client 202a. Similarly, the client 202a may send data to a compute host 200 and the compute host may then send the data to the client 202d (e.g., to confirm that the sprinkler was turned on by the command).

Figure 3A:
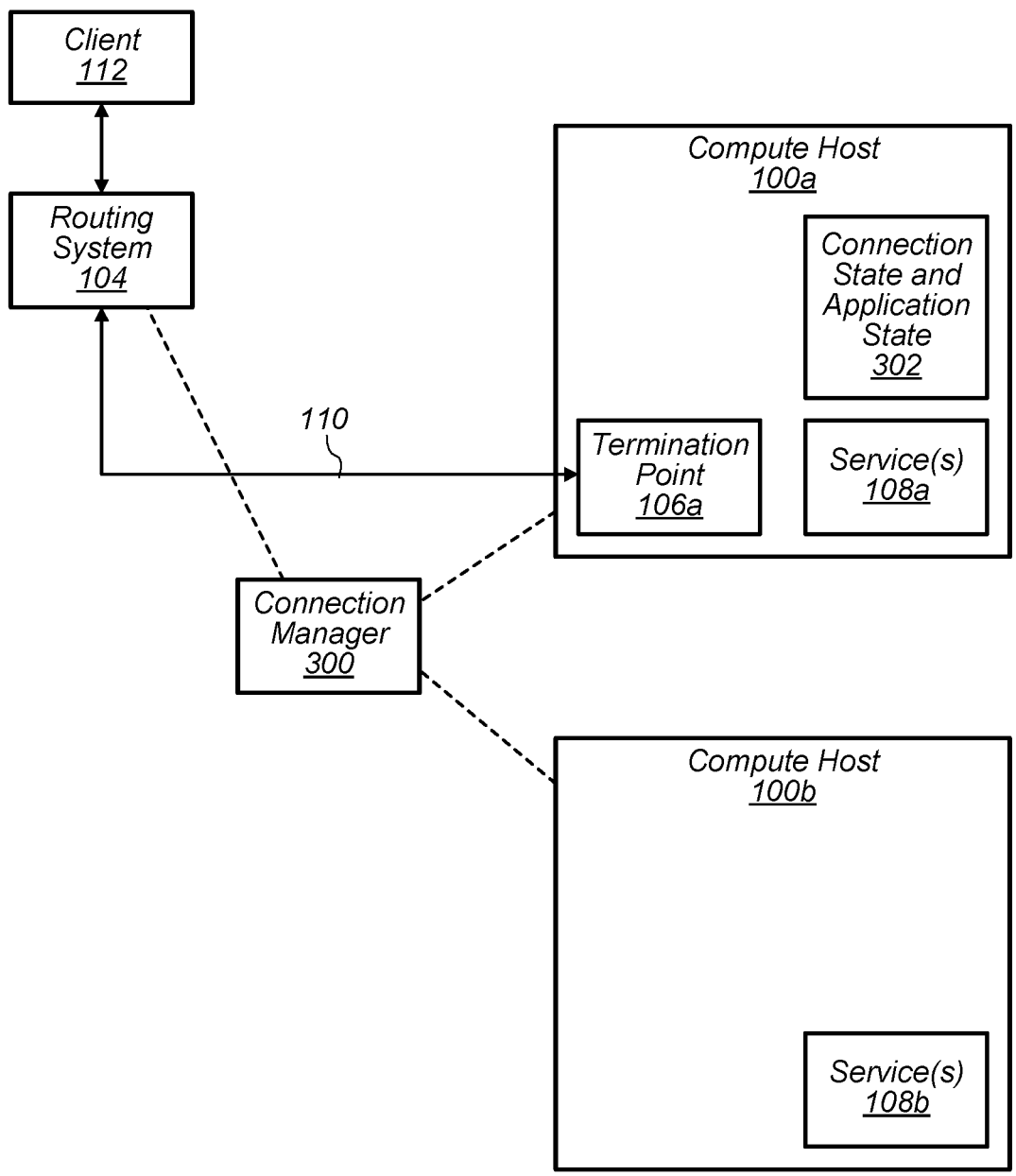
FIG. 3A illustrates a system and a process for managing a connection for a client, according to some embodiments.

FIG. 3A illustrates a system and a process for managing a connection for a client, according to some embodiments. In the depicted embodiment, a connection manager 300 may communicate with the routing system 104, the compute host 100a, and the compute host 100b. In embodiments, the connection manager 300 may be implemented by a computing device (e.g., a compute host or other server) of the service provider 102 separate from the compute hosts 100a and 100b.

Similarly, the routing system 104 may be implemented by another computing device (e.g., a compute host 100 or other server) of the service provider 102 separate from the compute hosts 100*a* and 100*b* and separate from the computing device implementing the connection manager. However, various other embodiments may include any other combination of arrangements of the connection manager, the routing system, and one or more of the compute hosts 100. For example, the connection manager 300 may be implemented by the compute host 100*a* or the compute host 100*b*. In some embodiments, the routing system 104 and the connection manager 300 are implemented by the same computing device or compute host. Furthermore, in embodiments, any of the decisions and/or determinations described for FIGS. 1-9 may be made by the connection manager, the routing system, a client, or one or more of the compute hosts 100 and any of the indications described for FIGS. 1-9 may be provided by the connection manager, the routing system, a client, or one or more of the compute hosts 100. Thus, in various embodiments, any one component or combination of components may provide any of the described functions or implement any of the described operations.

In an embodiment, in response to an indication to transfer the connection 110 from the compute host 100*a* to the compute host 100*b*, the compute host 100*a* obtains a connection state and an application state 302 for the connection 110 and transmits the connection state and application state 302 from the compute host 100*a* to the compute host 100*b*. The indication to transfer the connection may be generated and/or provided by the compute host 100*a* or another component (e.g., a connection manager) and may be based on one or more criteria. For example, the indication may be generated in response to determining that network traffic at the compute host 100*a* is above a threshold amount, that memory and/or CPU usage is above a threshold amount, or that one or more performance metrics for the compute host 100*a* fail to meet a minimum threshold value. In some cases, the indication may be generated in response to determining that one or more other compute hosts are available for establishing one or more additional connections or that one or more other compute hosts are requesting one or more connections. In some cases, the indication may be generated in response to determining that the compute host 100*a* is overloaded with connection traffic or that the compute host 100*a* will be rebooted and/or one or more services of the compute host 100*a* will be restarted.

The compute host 100*a* may obtain the connection state and the application state 302 using any suitable technique. For example, the compute host 100*a*, the connection manager 300, and/or another component of the compute host 100*a* may gather/collect information for the connection state and the application state 302 from one or more sources, such as one or more services 108*a* running on the compute host 100*a*, one or more operating systems running on the compute host 100*a*, and any other software and/or hardware component of the compute host 100*a*. At least some of the information for the connection state and the application state 302 may be processed before it is sent to the compute host 100*b*. In some cases, at least some of the connection state and the application state 302 may be gathered and updated at a predetermined periodic interval.

In embodiments, the connection state includes information for a connection-oriented protocol (e.g., TCP) and the application state includes information for an application-layer protocol (e.g., TLS, MQTT, HTTP). In some embodiments, the indication to transfer the connection 110 may be sent from the connection manager 300, the routing system 104, the compute host 100*b*, from the compute host 100*a* (e.g., from a service 108*a*), the client 112, or from another computing device of the service provider 102.

Figure 3B:
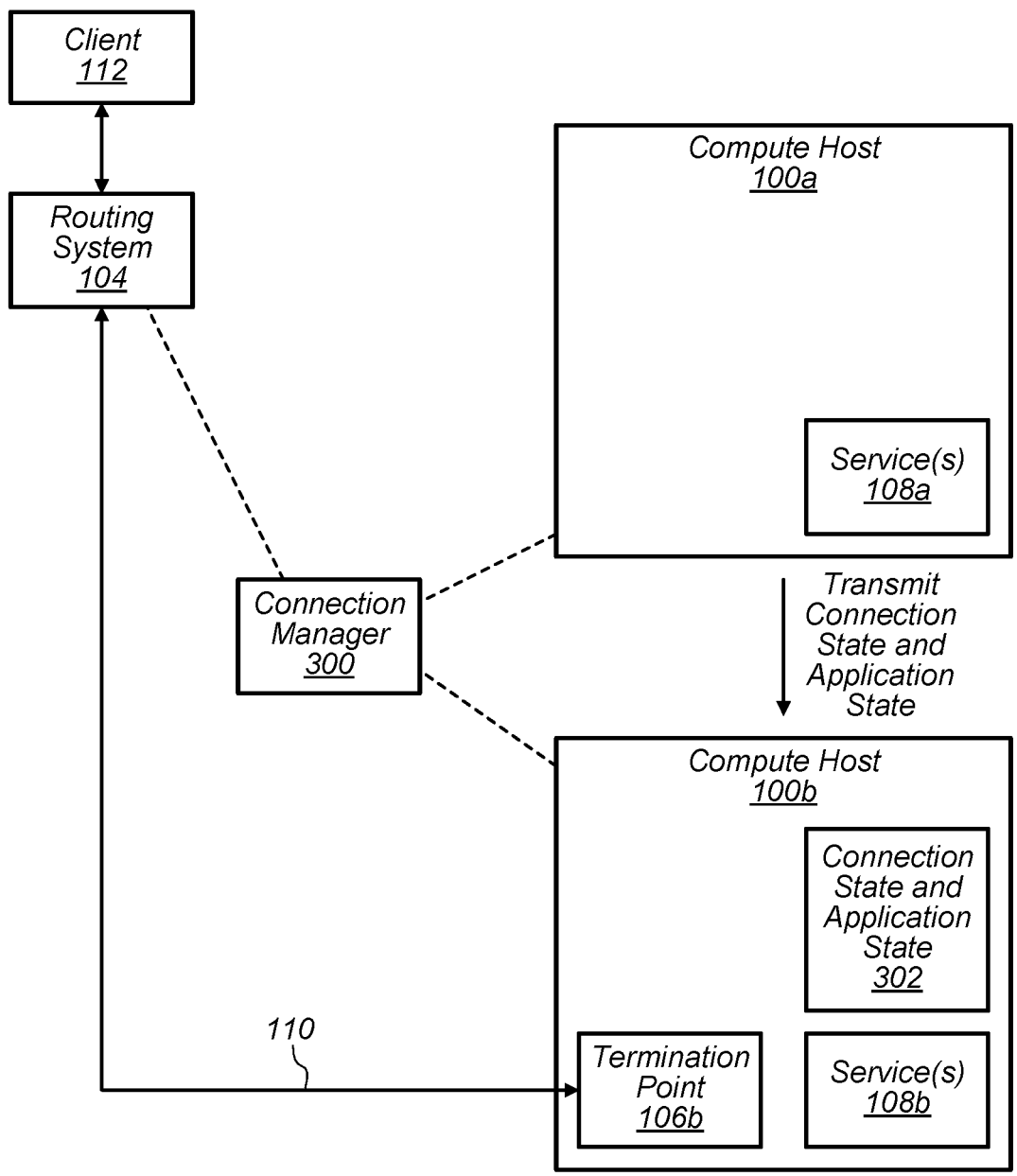
FIG. 3B illustrates a system and a process for managing connection and application state migration for a client, according to some embodiments.

FIG. 3B illustrates a system and a process for managing connection and application state migration for a client, according to some embodiments. In the depicted embodiment, the compute host 100*b* receives and applies the connection state and application state 302 to the compute host 100*b* in order to establish the termination point 106*b* to terminate the connection 110 at the compute host 100*b* instead of at the compute host 106*a*.

In embodiments, subsequent to establishing the termination point 106*b*, the routing system routes the data for the connection 110 to the compute host 100*b*. In an embodiment, the client 112 is unaware of transfer of the connection 110 from the compute host 100*a* to the compute host 100*b*. In embodiments, subsequent to establishment of the termination point 106*b*, the connection manager 300 instructs the routing system to route the data for the connection 110 to the compute host 100*b*. In other embodiments, the routing system 104, the compute host 100*b*, the compute host 100*a* (e.g., a service 108*a*), the client 112, or another computing device of the service provider 102 may instruct the routing system to route the data for the connection 110 to the compute host 100*b*.

Figure 4A:
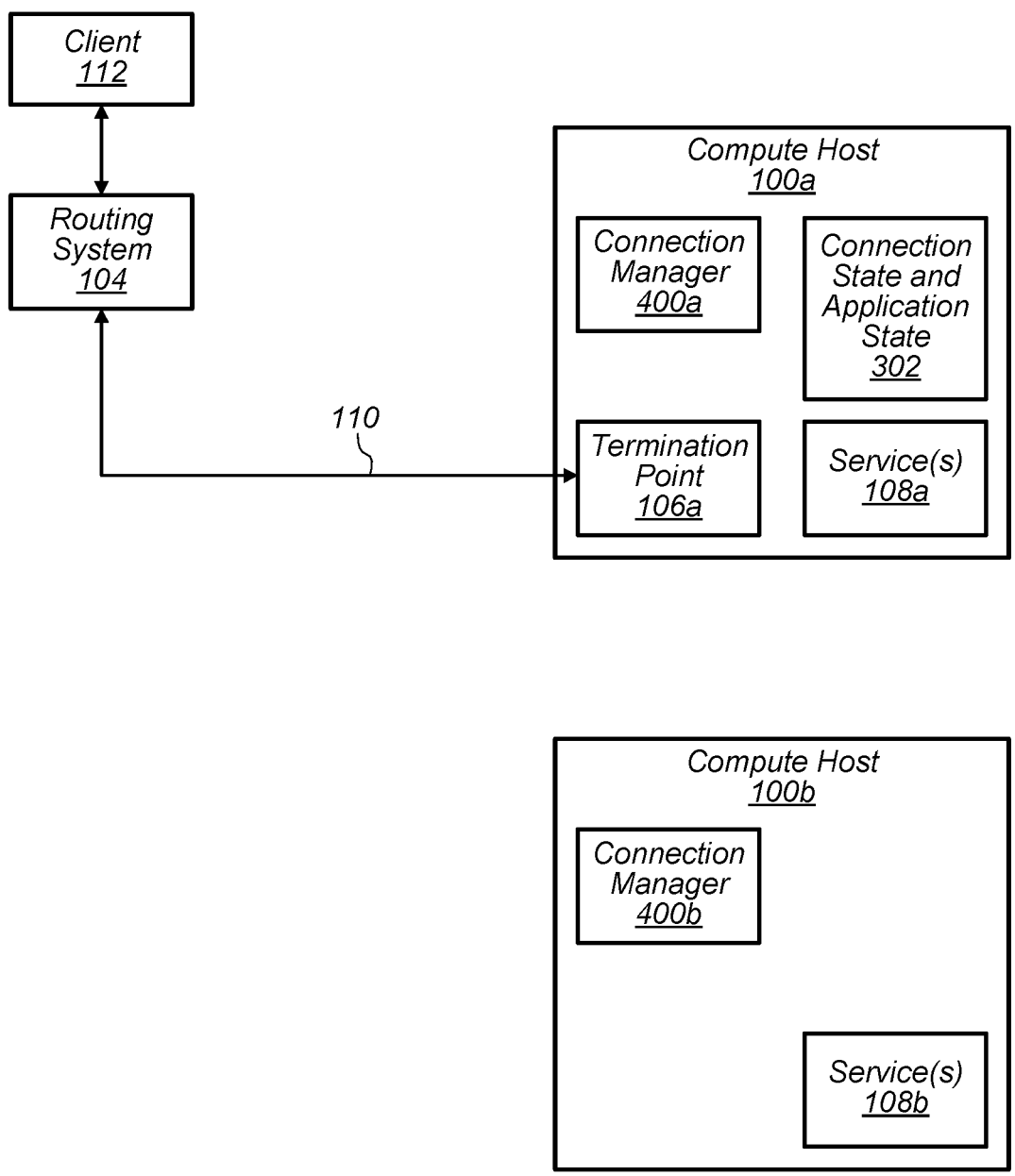
FIG. 4A illustrates a system and a process for managing a connection for a client, according to some embodiments.

FIG. 4A illustrates a system and a process for managing a connection for a client, according to some embodiments. In the depicted embodiment, a connection manager 300 may communicate with the routing system 104, the compute host 100*a*, and the compute host 100*b*. The connection manager 400 may be a distributed application with an instance of the connection manager 400*a* at compute host 100*a* and an instance of the connection manager 400*b* at compute host 100*b*. In embodiments, additional instances of the connection manager 400 may be implemented on one or more additional compute hosts 100 or other computing devices of the service provider 102.

As in FIG. 3A, in response to an indication to transfer the connection 110 from the compute host 100*a* to the compute host 100*b*, the compute host 100*a* obtains a connection state and an application state 302 for the connection 110 and transmits the connection state and application state 302 from the compute host 100*a* to the compute host 100*b*. In some embodiments, the indication to transfer the connection 110 may be sent from the connection manager 400*a* or 400*b*, the routing system 104, the compute host 100*b*, the compute host 100*a* (e.g., from a service 108*a*), the client 112, or from another computing device of the service provider 102.

Figure 4B:
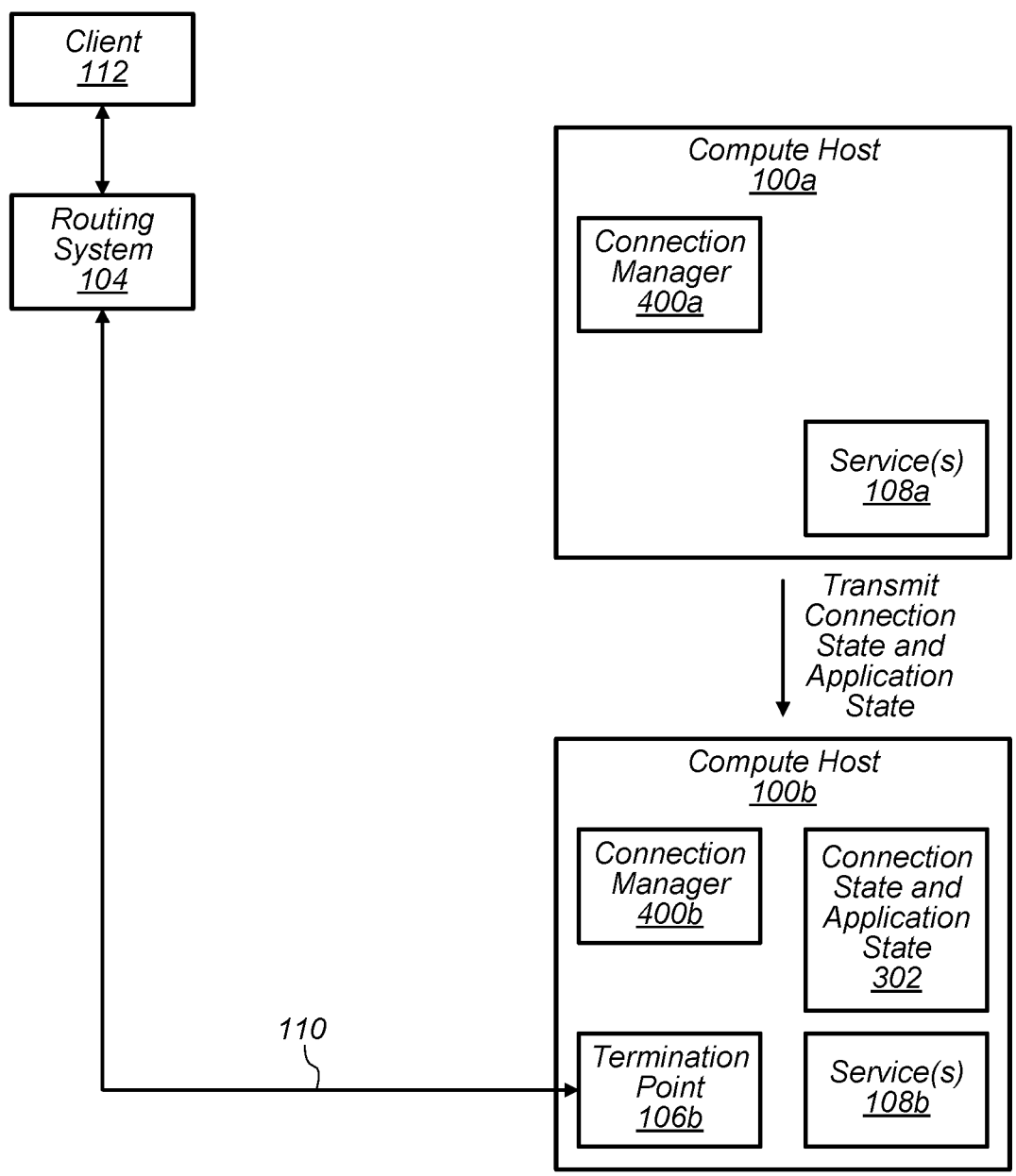
FIG. 4B illustrates a system and a process for managing connection and application state migration for a client, according to some embodiments.

FIG. 4B illustrates a system and a process for managing connection and application state migration for a client, according to some embodiments. As in FIG. 3B, the compute host 100*b* receives and applies the connection state and application state 302 to the compute host 100*b* in order to establish the termination point 106*b* to terminate the connection 110 at the compute host 100*b* instead of at the compute host 106*a*.

In embodiments, subsequent to establishing the termination point 106*b*, the routing system routes the data for the connection 110 to the compute host 100*b*. In an embodiment, the client 112 is unaware of transfer of the connection 110 from the compute host 100*a* to the compute host 100*b*. In embodiments, subsequent to establishment of the termination point 106*b*, the connection manager 400*a* or 400*b* instructs the routing system to route the data for the connection 110 to the compute host 100*b*. In other embodiments, the routing system 104, the compute host 100*b*, the compute host 100*a* (e.g., a service 108*a*), the client 112, or another computing device of the service provider 102 may instruct the routing system to route the data for the connection 110 to the compute host 100*b*.

Figure 5:
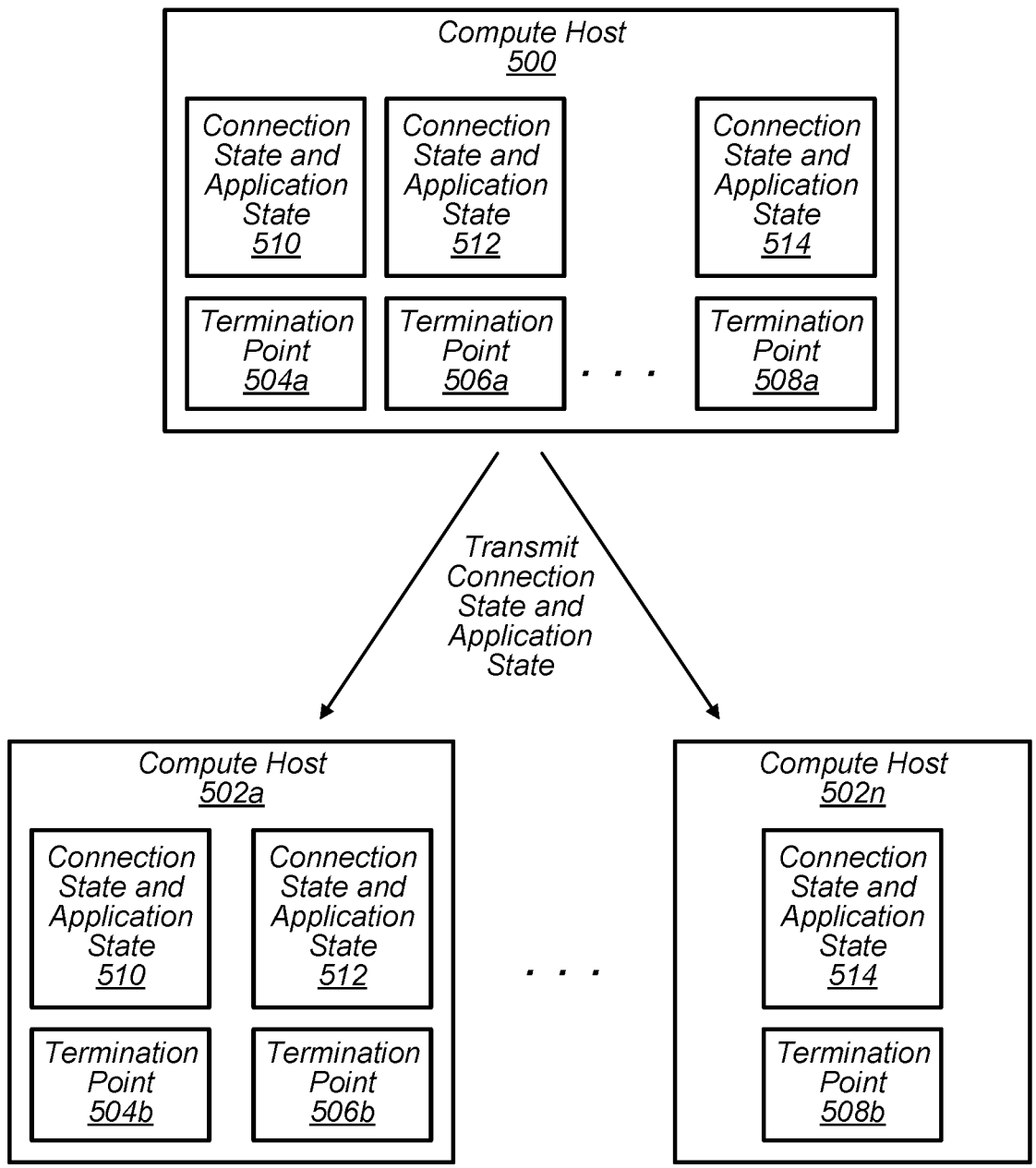
FIG. 5 illustrates a system and a process for migrating multiple connections from a compute host to one or more other compute hosts, according to some embodiments.

FIG. 5 illustrates a system and a process for migrating multiple connections from a compute host to one or more other compute hosts, according to some embodiments. In embodiments, a connection manager 300 or a distributed connection manager 400 may be implemented for compute host 500 and compute host 502a through compute host 502n, as described for FIGS. 3 and 4. Thus, any number of compute hosts may exist in addition to compute host 502a and compute host 502n. If the distributed connection manager 400 is implemented, then an instance of the distributed connection manager 400 may be implemented on each of compute host 500 and compute host 502a through compute host 502n. Furthermore, a routing system 104 may be implemented for compute host 500 and compute host 502a through compute host 502n, as described for FIGS. 1-4.

In embodiments, the compute host 500 maintains a connection with a client device (e.g., client 202a) that terminates at termination point 504a, a connection with a client device (e.g., client 202b) that terminates at termination point 506a, and a connection with a client device (e.g., client 202c) that terminates at termination point 508a. In response to an indication to transfer multiple connections or all of the connections from the compute host 500 to one or more of the compute hosts 502 (e.g., to reduce a load on the compute host 500 or to prepare for a reboot of the compute host after a software upgrade), the compute host may obtain and transmit a connection state and an application state for some or all of the connections from the compute host 500 to one or more of the compute hosts 502.

For example, in the depicted embodiment, in response to an indication to transfer multiple connections or all of the connections from the compute host 500 to one or more of the compute hosts 502, the compute host 500 may obtain the connection state and the application state 510 for the connection that terminates at termination point 504a, obtain the connection state and the application state 512 for the connection that terminates at termination point 506a, and obtain the connection state and the application state 514 for the connection that terminates at termination point 508a.

The compute host 500 may then transmit the connection state and the application state 510 to compute host 502a, transmit the connection state and the application state 512 to compute host 502a, and transmit the connection state and the application state 514 to compute host 502n. In embodiments, the compute host 502a may receive and apply the connection state and the application state 510 to compute host 502a in order to establish the termination point 504b and receive and apply the connection state and the application state 512 to compute host 502a in order to establish the termination point 506b, and the compute host 502n may receive and apply the connection state and the application state 514 to compute host 502n in order to establish the termination point 508b.

In embodiments, after the multiple connections or all of the connections are transferred from the compute host 500 to one or more of the compute hosts 502, the compute host 500 is rebooted and/or one or more services running on the compute host 500 are restarted. In some embodiments, the compute host is 500 rebooted and/or one or more services are restarted subsequent to the compute host transmitting the connection state and the application state 510, 512, and 514 for one or more of the connections at the compute host 500 to the compute hosts 502. Thus, in some embodiments, the compute host 500 may be rebooted before one or more of the connections at the compute host 500 are transferred and/or established at the compute hosts 502.

In an example embodiment, migration of connections between hosts may be useful for testing new and/or updated software (or hardware) on compute hosts and re-balancing connections among compute hosts. For example, a software update may be performed for a set of one or more compute hosts. Then, one or more connections may be migrated from another set of one or more other compute hosts to the set of compute hosts in order to test the new or updated software. In embodiments, one or more performance metrics for the migrated connections on the set of compute hosts may be measured (e.g. traffic metrics, memory usage, connection latency, etc.). If one or more of the performance metrics meet or exceed one or more respective threshold values, then a determination may be made (e.g., by a connection manager or other component) to perform a software update for the one or more other compute hosts as well.

Thus, after the connections are migrated to the set of compute hosts, the other set of compute hosts may be updated with the new and/or updated software (or hardware). After the other set of compute hosts are updated, one or more of the connections on the set of compute hosts may be migrated back to the other set of compute hosts, until a more even balance of connections and/or network traffic for the connections is achieved among the set of compute hosts and the other set of compute hosts. Any suitable technique for re-balancing network traffic for the connections among the compute hosts may be implemented.

In embodiments, one or more connections are migrated between compute hosts until it is determined that traffic for the one or more connections has been balanced and/or distributed among the compute hosts to an acceptable level. For example, a traffic throughput (e.g., amount of data transferred) at each of the compute hosts may be measured over a particular time period and if the difference in traffic throughput between at least two (or any two) of the compute hosts is less than a threshold amount, it may be determined that the traffic is balanced among the compute hosts. If not, then one or more connections may be migrated from one compute host to another until balance is achieved (e.g., migrating one or more connections from a compute host with higher traffic to another compute host with lower traffic).

Figure 6:
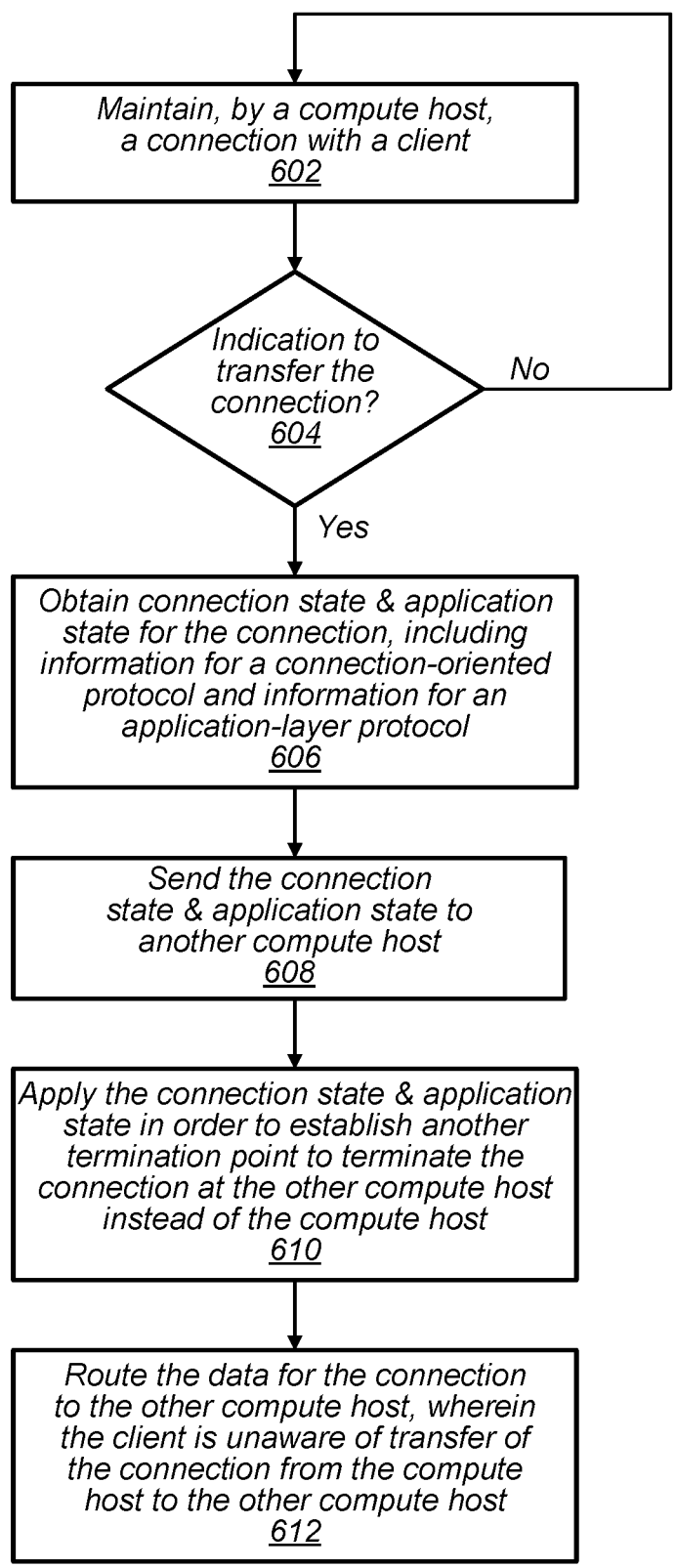
FIG. 6 is a flow diagram of a process for connection and application state migration for uninterrupted service availability, according to some embodiments.

FIG. 6 is a flow diagram of a process for connection and application state migration for uninterrupted service availability, according to some embodiments. One or more portions of the illustrated process may be performed via one or more components of the service provider, such as a routing system 104 and one or more compute hosts 100.

At block 602, a compute host 100a maintains a connection 110 with a client 112 and terminates the connection 110 at a termination point 106a of the compute host 100a. A routing system 104 may route data for the connection 110 between the client 112 and the compute host 100a. At block 604, the compute host 100a determines whether there is an indication to transfer the connection 110 to another compute host 100b. If there is no indication, then the process returns to block 602. If there is an indication to transfer the connection 110 to another compute host 100b, then the processes proceeds to block 606. As discussed above, in some embodiments, a connection manager may provide the indication.

At block 606, the compute host 100a obtains a connection state and an application state 302 for the connection 110. The connection state may comprise information for a connection-oriented protocol and the application state may comprise information for an application-layer protocol. In embodiments, the application state may comprise other information for a state of an application (e.g., service 108a) or session that is used by the client and/or the connection 110.

At block 608, the compute host 100a sends the connection state and the application state 302 to the other compute host 100b. In some embodiments, data for the connection state and the application state 302 is packaged and/or transformed (e.g., compressed, frozen, etc.) before it is sent to the other compute host 100b, where it is unpackaged and/or transformed (e.g., uncompressed, thawed, etc.) before being applied at the other compute host 100b.

At block 610, the other compute host 100b receives the connection state and the application state 302 and applies the connection state and the application state 302 to the other compute host 100b in order to establish another termination point 106b to terminate the connection 110 at the other compute host 100b instead of at the compute host 100a. Thus, in embodiments, applying the connection state and the application state 302 to the other compute host 100b prepares the compute host 100b to establish the connection 110 when migrating the connection 110 from the compute host 100a to the compute host 100b.

At block 612, subsequent to establishing the other termination point 106b for the connection 110 at the other compute host 100b, the routing system 104 routes data for the connection from the client 112 to the other compute host 100b (and from the other compute host 100b to the client 112). As discussed above, in some embodiments, a connection manager may instruct the routing system 104 to route the data for the connection from the client 112 to the other compute host 100b (and from the other compute host 100b to the client 112). In embodiments, the client 112 is unaware of the transfer of the connection 110 from the compute host 100a to the other compute host 100b. Thus, the transfer of the connection 110 may be transparent to the client 112, and not affect processes or operations of the client.

Figure 7:
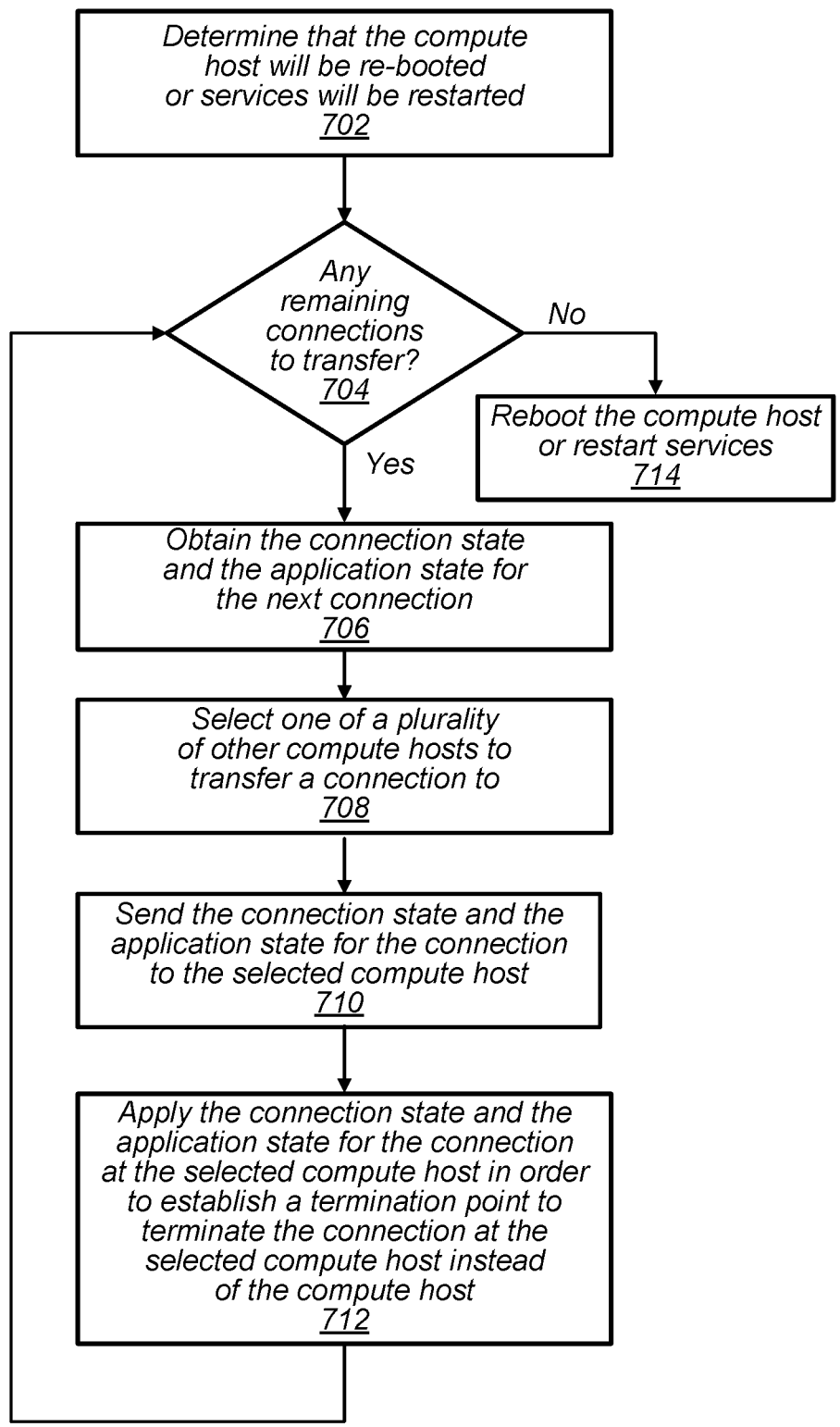
FIG. 7 is a flow diagram of a process for connection and application state migration for uninterrupted service availability when rebooting a compute host, according to some embodiments.

FIG. 7 is a flow diagram of a process for connection and application state migration for uninterrupted service availability when rebooting a compute host, according to some embodiments. One or more portions of the illustrated process may be performed via one or more components of the service provider, such as a routing system 104 and one or more compute hosts 100.

At block 702, a compute host 500 determines that the compute host 500 will be rebooted and/or that one or more services will be restarted (e.g., reset, powered down and powered back up, stopping and restarting services, etc.). At block 704, the compute host 500 determines whether there are any remaining connections to transfer from the compute host 500 to another compute host. If not, then the process proceeds to block 714, where the compute host 500 is rebooted and/or one or more services are restarted. If there are one or more remaining connections to transfer, then the process proceeds to block 706. In some embodiments, the compute host 502 may select the remaining connection from a plurality of remaining connections to transfer next, based on one or more criteria (e.g., highest bandwidth usage or lowest bandwidth usage within a particular period of time, etc.).

At block 706, the compute host 500 obtains a connection state and an application state for the next remaining connection 110 between the compute host 500 and a client 112, where the next remaining connection 110 terminates at a termination point 504 of the compute host 500.

At block 708, the compute host selects one of a plurality of other compute hosts 502 to transfer a remaining connection to. In some embodiments, the compute host 502 may select the one of a plurality of other compute hosts 502 to transfer a remaining connection to based on one or more criteria (e.g., lowest bandwidth usage of the compute hosts within a particular period of time, least number of active connections to clients, highest available bandwidth, etc.).

At block 710, the compute host sends the connection state and the application state for the selected connection 110 to the selected compute host 502. At block 712, the selected compute host applies the connection state and the application state for the selected connection 110 to the selected compute host 502 in order to establish a termination point to terminate the selected connection 110 at the selected compute host 502 instead of at the compute host 500. The process then returns to block 706, where the compute host 500 determines whether there are any remaining connections to transfer from the compute host 500 to another compute host.

Figure 8:
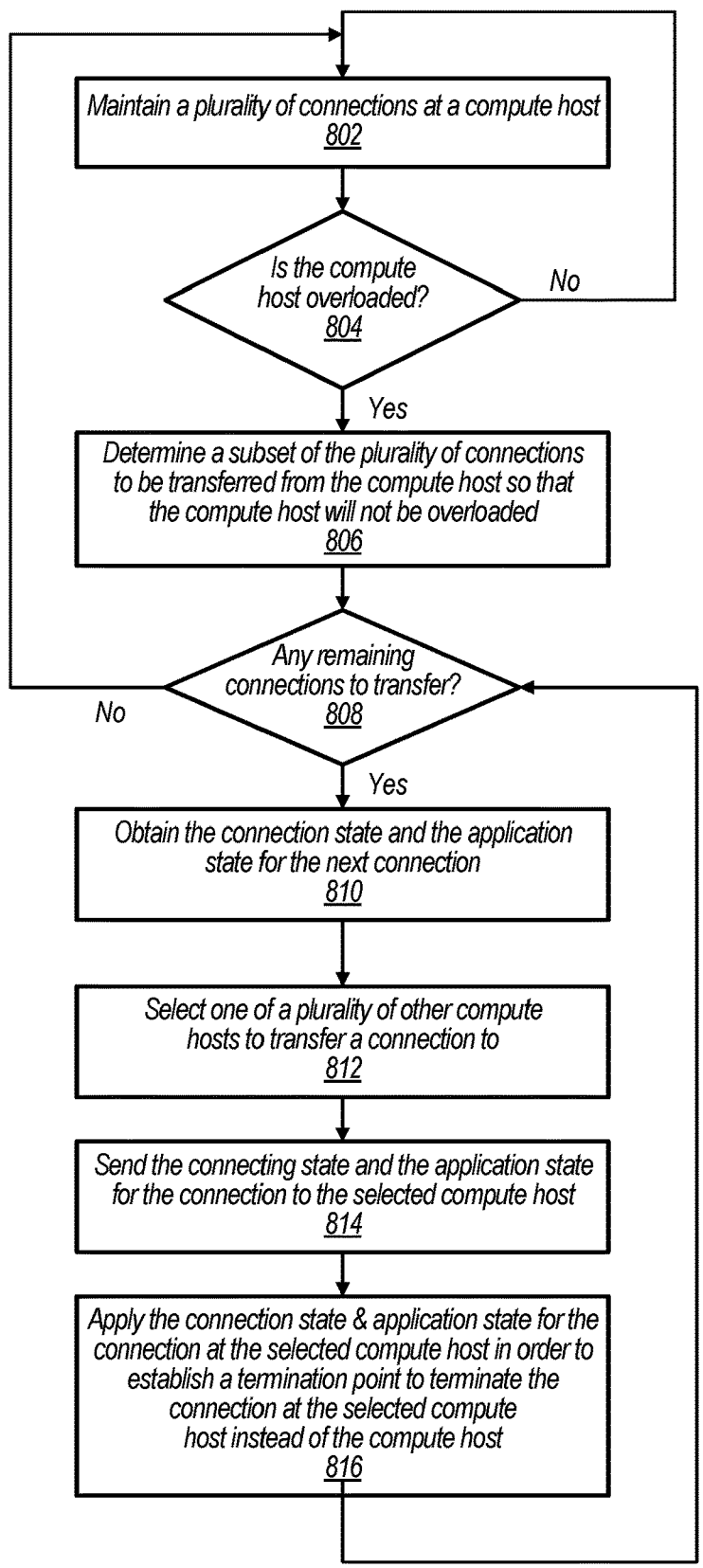
FIG. 8 is a flow diagram of a process for connection and application state migration for uninterrupted service availability when a compute host becomes overloaded, according to some embodiments.

FIG. 8 is a flow diagram of a process for connection and application state migration for uninterrupted service availability when a compute host becomes overloaded, according to some embodiments. One or more portions of the illustrated process may be performed via one or more components of the service provider, such as a routing system 104 and one or more compute hosts 100.

At block 802, a compute host 500 maintains a plurality of connections 110 with a plurality of respective clients 112, wherein of the plurality of connections 110 terminates at a termination point 504 of the compute host 500. At block 804, the compute host 500 determines whether the compute host 500 is overloaded due to one or more of the connections 110 at the compute host. In embodiments, the compute host 500 may determine that the compute host 500 is overloaded in response to determining that a bandwidth used for the plurality of connections 110 exceeds a predetermined threshold value, the number of the plurality of connections 110 exceeds a predetermined threshold value, a performance indicator for the compute host 500 drops below a threshold value, or in response to determining that one or more other metrics suitable for measuring a load exceed a predetermined value (or fall below a predetermined value). If the compute host 500 determines that the compute host 500 is not overloaded, then the process returns to block 802. If the compute host 500 determines that the compute host 500 is overloaded, then the process proceeds to block 806.

At block 806, the compute host 500 determines a subset of the plurality of connections 110 to be transferred from the compute host 500 to one or more other compute hosts so that the compute host 500 will no longer be overloaded. In embodiments, the compute host 500 determines the subset of the plurality of connections 110 in response to determining that transferring the subset of the plurality of connections 110 will cause bandwidth used for the plurality of connections 110 to meet or fall below a predetermined threshold value, cause the number of the plurality of connections 110 to meet or fall below a predetermined threshold value, cause a performance indicator for the compute host 500 to meet or exceed a threshold value, or cause one or more other metrics suitable for measuring a load to meet or fall below a predetermined value (or exceed a predetermined value).

At block 808, the compute host 500 determines whether there are any remaining connections from the subset of the plurality of connection 110 to transfer from the compute host 500 to another compute host. If not, then the process returns to block 802. If there are one or more remaining connections to transfer, then the process proceeds to block 810. In some embodiments, the compute host 502 may select the remaining connection from a plurality of remaining connections to transfer next, based on one or more criteria (e.g., highest bandwidth usage or lowest bandwidth usage within a particular period of time, etc.). At block 810, the compute host 500 obtains a connection state and an application state for the next connection of the subset of the plurality of connections 110 to transfer.

At block 812, the compute host selects one of a plurality of other compute hosts 502 to transfer a remaining connection to. In some embodiments, the compute host 502 may select the one of a plurality of other compute hosts 502 to transfer a remaining connection to based on one or more criteria (e.g., lowest bandwidth usage of the compute hosts within a particular period of time, least number of active connections to clients, highest available bandwidth, etc.).

At block 814, the compute host sends the connection state and the application state for the selected connection 110 to the selected compute host 502. At block 816, the selected compute host applies the connection state and the application state for the selected connection 110 to the selected compute host 502 in order to establish a termination point to terminate the selected connection 110 at the selected compute host 502 instead of at the compute host 500. The process then returns to block 810, where the compute host 500 determines whether there are any remaining connections of the subset of the plurality of connections 110 to transfer from the compute host 500 to another compute host.

Figure 9:
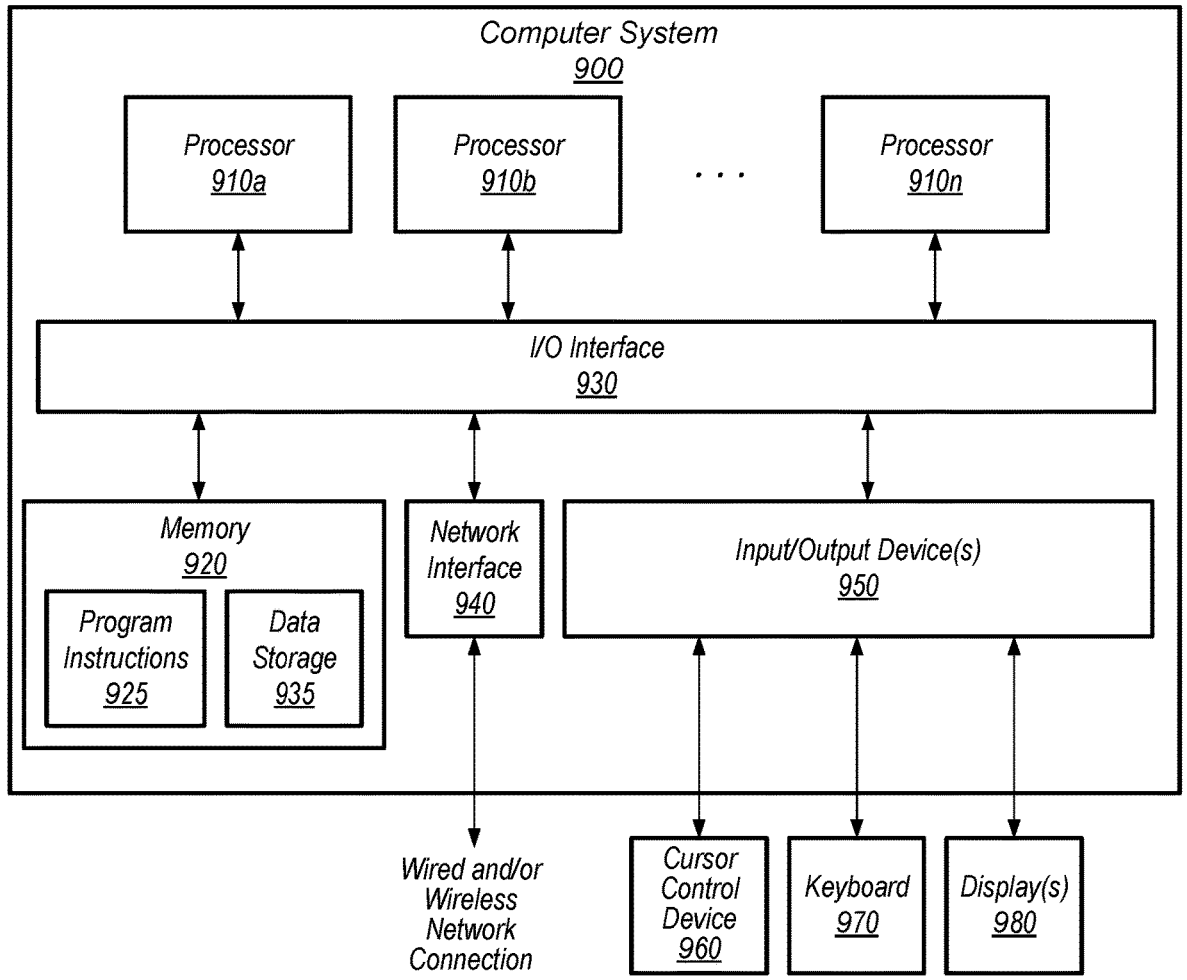
FIG. 9 is a block diagram illustrating an example computer system that implements some or all of the techniques described herein, according to some embodiments.

Any of various computer systems may be configured to implement processes associated with connection and application state migration for uninterrupted service availability. For example, FIG. 9 is a block diagram illustrating one embodiment of a computer system suitable for implementing at least some of the systems and methods described herein. In various embodiments, the compute hosts 100 and/or the routing system 104 may each include one or more computer systems 900 such as that illustrated in FIG. 9 or one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 920 as program instructions 925. In some embodiments, system memory 920 may include data 935 which may be configured as described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as between the shippable storage device 100 and other computer systems, for example. In particular, network interface 940 may be configured to allow communication between computer system 900 and/or various I/O devices 950. I/O devices 950 may include scanning devices, display devices, input devices and/or other communication devices, as described herein. Network interface 940 may commonly support one or more wireless networking protocols (e.g., Wi-Fi/IEEE 802.7, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device, keyboard, or display(s) may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    a plurality of computing devices comprising respective hardware processors and memory, and configured to implement:
        a plurality of compute hosts, wherein respective ones of the compute hosts are configured to maintain respective connections with one or more internet-capable devices and to send one or more commands to or receive data from the one or more internet-capable devices over the respective connections, wherein the one or more respective connections terminate at one or more termination points; and
        a routing system configured to route data for the respective connections maintained by the respective ones of the compute hosts,
        wherein a particular compute host of the compute hosts is configured to, in response to an indication to transfer a connection with one of the internet-capable devices from the particular compute host to another compute host of the compute hosts, obtain a connection state and an application state for the connection and send the connection state and the application state to the other compute host, and wherein the connection state comprises information for a connection-oriented protocol and the application state comprises information for an application-layer protocol for the connection, and
        wherein the other compute host is configured to:
            receive the connection state and the application state from the particular compute host;
            apply the connection state and the application state in order to establish another termination point to terminate the connection at the other compute host instead of at the particular compute host; and
            subsequent to establishing the other termination point for the connection at the other compute host, instruct, by the other compute host, the routing system to route subsequent packets for the connection received from the internet-capable device to the other compute host instead of the particular compute host and to route data for the connection from the other compute host to the internet-capable device,
        wherein, subsequent to establishing the other termination point for the connection at the other compute host, the routing system is configured to route the subsequent packets for the connection to the other compute host and to route data for the connection from the other compute host to the internet-capable device, and wherein an internet-capable device using the connection is unaware of transfer of the connection from the particular compute host to the other compute host and continues to receive one or more commands or send data over the same connection without having to establish a connection with the other compute host.

2. The system as recited in claim 1, wherein the indication to transfer the connection comprises an indication to transfer connections from the particular compute host to one or more of the plurality of compute hosts to prepare for a reboot of the compute host, and wherein the particular compute host is further configured to:
    obtain an additional connection state and an additional application state for one or more respective remaining connections maintained at the particular compute host;
    send the additional connection state and the additional application state for the one or more respective remaining connections to a respective one or more of the plurality of compute hosts; and
    subsequent to the sending of the additional connection state and the additional application state for the one or more respective remaining connections to the respective one or more of the plurality of compute hosts, reboot the particular compute host.

3. The system as recited in claim 1, wherein the indication to transfer the connection comprises an indication to transfer a subset of connections from the particular compute host to one or more of the plurality of compute hosts to reduce a load on the compute host, and wherein the particular compute host is further configured to:
   obtain an additional connection state and an additional application state for one or more remaining connections of the subset maintained at the particular compute host; and
   send the additional connection state and the additional application state for the one or more respective remaining connections of the subset to a respective one or more of the plurality of compute hosts.

4. The system as recited in claim 1, wherein the plurality of computing devices are further configured to implement:
   a connection manager configured to:
      provide the indication to transfer the connection from the particular compute host to the other compute host based at least on an amount of network traffic at the particular compute host, an amount of memory utilization at the particular host, an amount of processor utilization at the particular host, or availability of the other compute host to establish an additional connection.

5. A method, comprising:
   performing, by a plurality of computing devices:
      maintaining, by respective ones of a plurality of compute hosts, respective connections with one or more internet-capable devices, wherein the respective connections terminate at one or more termination points at the compute host, and wherein the compute host sends one or more commands to or receives data from the one or more internet-capable devices over the respective connections;
      in response to an indication to transfer a connection with one of the internet-capable devices from a particular compute host to another compute host of the compute hosts, obtaining, by the particular compute host, a connection state and an application state for the connection and sending the connection state and the application state to the other compute host;
      receiving, by the other compute host, the connection state and the application state from the particular compute host and applying the connection state and the application state in order to establish another termination point to terminate the connection at the other compute host instead of at the particular compute host; and
      subsequent to establishing the other termination point for the connection at the other compute host:
         instructing, by the other compute host, a routing system to route subsequent packets for the connection received from the internet-capable device to the other compute host instead of the particular compute host and to route data for the connection from the other compute host to the internet-capable device; and
         routing the subsequent packets for the connection to the other compute host and routing data for the connection from the other compute host to the internet-capable device,
         wherein an internet-capable device using the connection is unaware of transfer of the connection from the particular compute host to the other compute host and continues to receive one or more commands or send data over the same connection without having to establish a connection with the other compute host.

6. The method as recited in claim 5, wherein the connection state comprises information for a connection-oriented protocol and the application state comprises information for an application-layer protocol, and further comprising:
   implementing, by respective ones of a plurality of compute hosts, a service that sends a plurality of commands to individual ones of the internet-capable devices during different time periods without the internet-capable device having to poll the service for a command.

7. The method as recited in claim 5, further comprising:
   providing the indication to transfer the connection from the particular compute host to the other compute host based at least on an amount of network traffic at the particular compute host, an amount of memory utilization at the particular compute host, an amount of processor utilization at the particular compute host, or availability of the other compute host to establish an additional connection.

8. The method as recited in claim 5, further comprising:
   receiving, from the routing system, the indication to transfer the connection from the particular compute host to the other compute host.

9. The method as recited in claim 5, further comprising:
   obtaining, by the particular compute host, an additional connection state and an additional application state for one or more respective remaining connections maintained at the particular compute host; and
   sending, by the particular compute host, the additional connection state and the additional application state for the one or more respective remaining connections to a respective one or more of the plurality of compute hosts, wherein another respective termination point for each of the one or more respective remaining connections is established at each of the respective one or more of the plurality of compute hosts.

10. The method as recited in claim 9, further comprising:
    subsequent to the sending of the additional connection state and the additional application state for the one or more respective remaining connections to the respective one or more of the plurality of compute hosts, restarting one or more services at the particular compute host.

11. The method as recited in claim 5, further comprising:
    obtaining an additional connection state and an additional application state for one or more remaining connections of a subset of a plurality of connections maintained at the particular compute host; and
    sending the additional connection state and the additional application state for the one or more respective remaining connections of the subset to a respective one or more of the plurality of compute hosts.

12. The method as recited in claim 5, further comprising:
    performing, by the plurality of computing devices:
       implementing a connection manager;
       providing, by the connection manager, the indication to transfer the connection from the particular compute host to the other compute host.

13. The method as recited in claim 5, wherein the internet-capable device sends data to the same target internet protocol address for the connection before and after the transfer of the connection from the particular compute host to the other compute host.

14. A computing device, comprising:
one or more processors; and
a memory, wherein the computing device is configured to:
receive a connection state and an application state for a connection from another computing device, wherein the connection state and the application state is based on the connection between an internet-capable device and the other computing device that terminates at a termination point of the other computing device, and wherein the other computing device is configured to send one or more commands to or receive data from the internet-capable device over the connection via a routing system; and
apply the connection state and the application state in order to establish another termination point, wherein the connection terminates at the termination point of the computing device instead of at the other computing device,
wherein, subsequent to establishing the other termination point for the connection at the computing device, the computing device is configured to:
instruct, by the computing device, the routing system to route subsequent packets for the connection received from the internet-capable device to the computing device instead of the other computing device and to route data for the connection from the computing device to the internet-capable device; and
receive the subsequent packets for the connection from the routing system and route data for the connection from the computing device to the internet-capable device, wherein the internet-capable device is unaware of the transfer of the connection from the other computing device to the computing device and continues to receive one or more commands or send data over the same connection.

15. The computing device as recited in claim 14, wherein the connection state comprises information for a connection-oriented protocol and the application state comprises information for an application-layer protocol.

16. The computing device as recited in claim 14, wherein the computing device is further configured to:
instruct, via an application programming interface, the routing system to change the target to and from which traffic is routed from and to the internet-capable device.

17. The computing device as recited in claim 14, wherein the computing device is further configured to:
establish the other termination point for the connection such that the internet-capable device sends data to the same target internet protocol address for the connection before and after the transfer of the connection from the other computing device to the computing device.

18. The computing device as recited in claim 15, wherein the connection-oriented protocol comprises a transmission control protocol and the application-layer protocol comprises at least one of a transport layer security (TLS) protocol, a message queuing telemetry transport (MQTT) protocol, or a hypertext transfer (HTTP) protocol.

19. The computing device as recited in claim 14, wherein the computing device is further configured to:
receive an additional connection state and an additional application state for one or more remaining connections from the other computing device, wherein the additional connection state and the additional application state for the one or more remaining connections is based on one or more remaining connections between one or more internet-capable devices and the other computing device that terminate at one or more termination points of the other computing device, and wherein the other computing device is configured to receive data for the one or more remaining connections from the routing system; and
apply the additional connection state and the additional application state in order to establish another one or more termination points, wherein the one or more remaining connections terminate at the other one or more termination points of the computing device instead of at the other computing device,
wherein, subsequent to establishing the other one or more termination points for the one or more remaining connections at the computing device, the computing device is configured to receive the data for the one or more remaining connections from the routing system, and wherein the one or more internet-capable devices are unaware of the transfer of the one or more remaining connections from the other computing device to the computing device.

20. The computing device as recited in claim 14, wherein the computing device is further configured to:
receive an additional connection state and an additional application state for a subset of a plurality of remaining connections from the other computing device, wherein the additional connection state and the additional application state for the subset of connections is based on one or more connections between one or more internet-capable devices and the other computing device that terminate at one or more termination points of the other computing device, and wherein the other computing device is configured to receive data for the one or more connections from the routing system; and
apply the additional connection state and the additional application state in order to establish another one or more termination points, wherein the subset of connections terminate at the computing device instead of at the other computing device,
wherein, subsequent to establishing the other one or more termination points for the subset of connections at the computing device, the computing device is configured to receive the data for the subset of connections from the routing system, and wherein the one or more internet-capable devices are unaware of the transfer of the subset of connections from the other computing device to the computing device.

* * * * *